United States Patent
Donders

(10) Patent No.: US 6,840,696 B1
(45) Date of Patent: Jan. 11, 2005

(54) METHOD FOR PRODUCING A BALL-AND-SOCKET JOINT BETWEEN A SLIPPER AND A PISTON, AND A BALL-AND-SOCKET JOINT OF THIS TYPE

(75) Inventor: Steven Donders, Horb (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 0 days.

(21) Appl. No.: 10/030,799
(22) PCT Filed: Jun. 29, 2000
(86) PCT No.: PCT/EP00/06077
§ 371 (c)(1), (2), (4) Date: Jan. 11, 2002
(87) PCT Pub. No.: WO01/07785
PCT Pub. Date: Feb. 1, 2001

(30) Foreign Application Priority Data

Jul. 21, 1999 (DE) .......................... 199 34 218

(51) Int. Cl.[7] .............................. F16C 11/00
(52) U.S. Cl. ................... 403/122; 29/511; 29/441.1; 92/181 R
(58) Field of Search ............... 403/56, 76, 90, 403/122; 29/510, 511, 441.1; 92/181 R, 172, 57, 71

(56) References Cited

U.S. PATENT DOCUMENTS

| | | | |
|---|---|---|---|
| 3,828,654 A | * | 8/1974 | Wiethoff ..................... 91/488 |
| 5,007,332 A | * | 4/1991 | Wagenseil ................. 92/181 R |
| 5,360,840 A | * | 11/1994 | Chan et al. .................. 523/428 |
| 5,591,293 A | * | 1/1997 | Miller et al. ........... 156/244.13 |
| 6,318,241 B1 | * | 11/2001 | Stoppek et al. ........... 92/181 R |

FOREIGN PATENT DOCUMENTS

| | | |
|---|---|---|
| DE | 197 34 217 A1 | 2/1998 |
| DE | 198 02 475 A1 | 7/1999 |
| EP | 0 371 834 A1 | 6/1990 |
| WO | WO 98/42949 | 10/1998 |

OTHER PUBLICATIONS

Serope Kalpakjian, Manufacturing Engineering and Technology 1995, Third Edition, pp. 381 and 383.*

* cited by examiner

Primary Examiner—William L. Miller
(74) Attorney, Agent, or Firm—Scully, Scott, Murphy & Presser

(57) ABSTRACT

A method of producing a ball-and-socket joint (1) between a slipper (3) and a piston (2) of a piston engine, which includes configuring the slipper (3) with a joint ball (4) at an end opposite a bottom surface (21); configuring the piston (2) with an overmeasure (x) on a lateral surface (2c), providing a hemispherical joint recess (5) with a recess edge (7) that protrudes beyond the maximum diameter (6) of the joint recess (5) for receiving the joint ball (4) and bringing together the joint recess (5) and the joint ball (4), and hot-beading the recess edge (7) into a form in which it grips the joint ball (4). Also provided is a joint formed by the foregoing method.

4 Claims, 2 Drawing Sheets

METHOD FOR PRODUCING A BALL-AND-SOCKET JOINT BETWEEN A SLIPPER AND A PISTON, AND A BALL-AND-SOCKET JOINT OF THIS TYPE

The invention relates to a method according to the precharacterising clause of claim 1 or 2 and a ball-and-socket joint according to the precharacterising clause of claim 7.

A method according to the precharacterising clause of claim 1 is described in DE 197 34 217 A1. In this known method, after connection to the slipper, the piston, prefabricated with a cross-section overmeasure, is positively connected to the slipper by cold-beading a recess edge radially protruding from the lateral surface, is then hardened at its lateral surface and then finished, in particular ground, at its lateral surface. This known method involves considerable expenditure of labour, the machining operation being the final operation. Moreover, considerable widening of the beading is to be expected, which can be attributed to the fact that the considerable stresses occurring during the cold working cause the beading to spring back and consequently the beading grips behind the joint ball only with comparatively large freedom of movement. Furthermore, this ball-and-socket joint is restricted to a comparatively soft material for the slipper, since harder materials cannot be beaded.

The object on which the invention is based is to simplify a method, and design a ball-and-socket joint, according to the precharacterising clause of claim 1, 2, and 7, in such a way that improved and/or more cost-effective production is possible.

This object is achieved by the features of claim 1 or 2, and 7.

In the inventive method according to claim 1, the lateral surface of the piston is finished before it is connected to the slipper and the recess edge is beaded after the hemispherical recess and the joint ball have been brought together. The bringing-together and connection of the piston and the slipper are thus the final steps of the method. In other words, all the other method steps can be carried out respectively on the parts of the ball-and-socket joint when they are still single, thereby significantly simplifying the handling of the parts and their positioning in the respective method step. Moreover, soiling of the ball-and-socket joint is avoided, since in the method according to the invention dirt which has accumulated previously can be simply cleaned off the surfaces of the joint before the piston and the slipper are brought together and connected, and after connection no more dirt accumulation occurs.

In contrast to the known method, in which the recess edge is cold-beaded, the method according to the invention involves structural transformation of the material by heating the recess edge, it being possible for this method step to be followed by two different method steps. On the one hand, the material of the recess edge is heated to a temperature such that the material structure undergoes a transformation to a material structure which is soft even in the cold state, after which the recess edge can be deformed by cold beading into a form in which it positively grips behind the joint ball. It is, however, also possible to heat the material, according to claim 3, to a temperature at which the strength of the material is reduced, in order to carry out hot beading at this temperature, the material being plastically deformable with comparatively low deformation forces. This requires lower deformation forces than those required in cold beading. The hot beading with lower deformation forces is particularly advantageous in order to not to impair the joint ball or the surface thereof during deformation of the recess edge and, moreover, in order to maintain a desired freedom of movement between the joint ball and the recess edge.

The above-described advantages also apply analogously to the inventive method according to claim 2 for producing a ball-and-socket joint in which the recess edge is arranged on the slipper.

Not only does a hot beading according to claim 3 or 7 permit the use of a material of higher strength, in particular steel, for the recess edge or piston and/or the slipper, but it can also be carried out with lower material stresses, so that the hot beading can be produced more accurately on account of lower elastic back-stresses and the ball-and-socket joint can be produced with smaller freedom of movement, avoiding impairment of the surface of the joint ball during the hot beading.

It is also advantageous to shape the recess edge with its outer lateral surface in a form converging, in particular conically, towards its free edge. As a result, the deformation forces required for the beading and also material loads resulting therefrom are further reduced. On the other hand, it has been found that such a tapering recess edge is able to absorb the axial forces (piston return forces) occurring during the operation of the piston machine safely, both when the recess edge consists of a metal with a good sliding property, such as, for example, brass or bronze, or of steel, which has a higher strength compared with the aforementioned sliding material. In cases where the slipper requires a high strength and at the same time a good sliding property, it is advisable to produce the slipper from metal with a high strength or hardness, in particular steel, and to design it in its base region with a sliding part forming its base surface.

Another measure for hardening the surfaces of the piston and/or slipper and at the same time ensuring a softer core, thereby achieving a high breaking strength, can be achieved by nitriding or gas-nitriding the surface of the piston and/or slipper.

A ball-and-socket joint according to the invention can be configured by forming the joint recess on the slipper or on the piston and the joint ball on whichever is the other joint part. The arrangement of the joint recess on the piston permits particularly favourable utilisation of the lateral surface of the piston as a guide surface, thus enabling a particularly short design of the piston machine to be achieved.

The invention and further advantages which can be obtained by means of the invention are explained in more detail below with the aid of advantageous configurations and drawings, in which FIG. 1 shows, in axial section, a ball-and-socket joint according to the invention between a slipper and a piston;

Figures 1, 2:
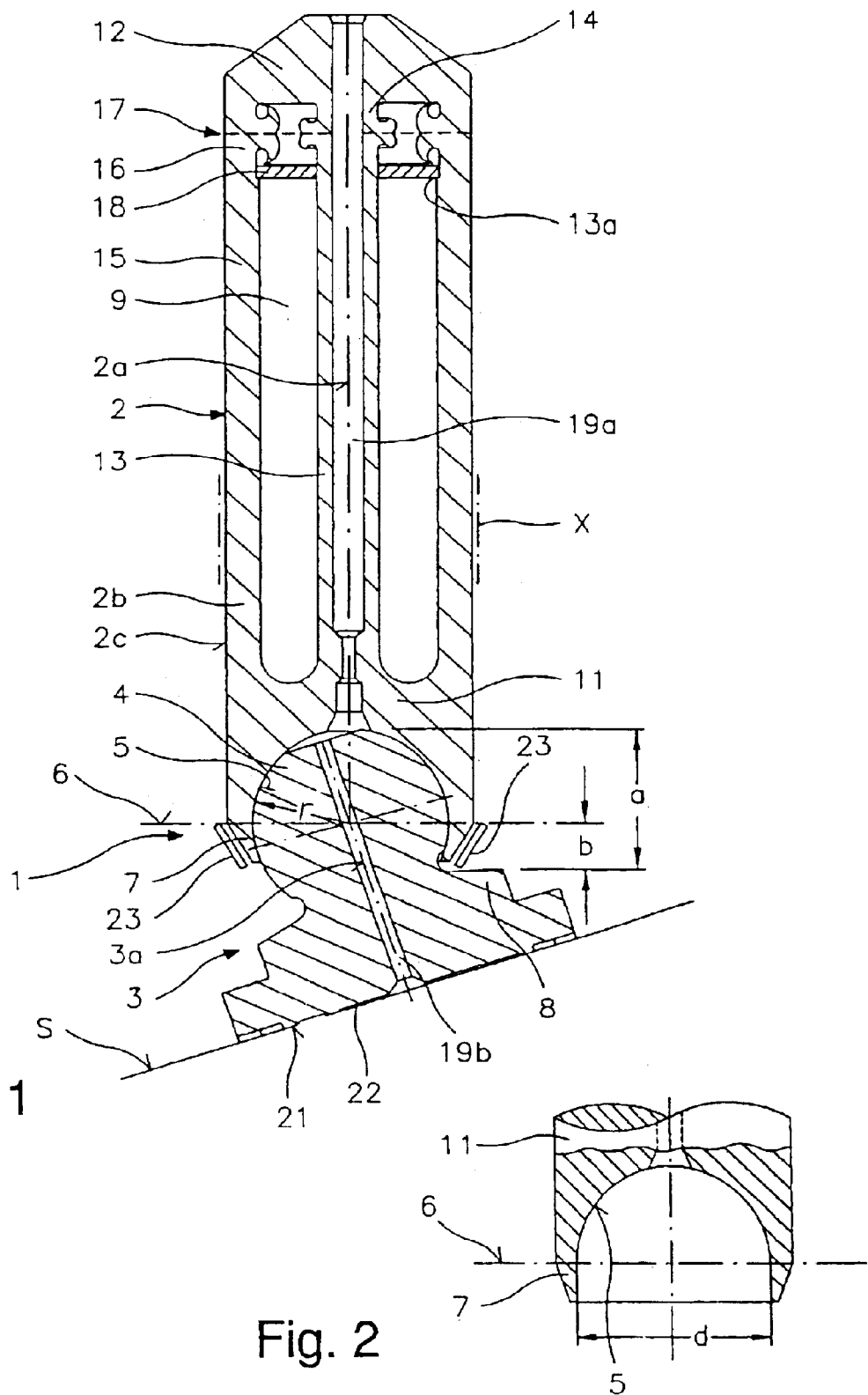
FIG. 2 shows a recess edge of the piston in a prefabricated form.

The ball-and-socket joint, denoted generally by 1, connects a piston 2, preferably made of steel, and a slipper 3, preferably made of bronze or brass (FIG. 1) or likewise made of steel (FIG. 3), while ensuring pivoting movements between the piston 2 and the slipper 3 which are limited on all sides. The centre axes of the piston 2 and the slipper 3 are denoted by 2a and 3a.

The ball-and-socket joint 1 comprises a spherical-cap-shaped or spherical-segment-shaped joint recess 5 with a depth a which is greater than the ball radius r of a joint ball 4 mounted pivotably therein, a recess edge 7 that protrudes axially beyond the equator 6 of the joint recess 5 gripping behind the joint ball 4 and at the same time following the convergent form of the joint ball in this ball ring zone while maintaining freedom of movement. As can be seen from FIG. 1, the axial length b of the recess edge 7 is dimensioned with a length such that it extends into the corner region between the joint ball 4 and a ball neck or a base part 8 of the slipper 3, in the maximum pivoted position illustrated in FIG. 1. In the present exemplary embodiment, the recess edge 7 tapers towards its free end, the outer lateral surface preferably being a conical surface.

The cylindrical piston 2 is preferably a hollow piston, of which the hollow space 9, configured in particular as an annular space, extends from a rear base section 11, in which the joint recess 5 is arranged, up to a front end section 12, which forms a cover and is preferably connected to the circumferential wall of the remaining part of the piston by a friction welding process. A broken line indicates the joint between the welded parts which is present before the friction welding process. The preferably annular hollow space 9 encloses a cylindrical central stem 13, which extends forwards in one piece from the base section 11 and is likewise connected by friction welding to the end section 12 or a central-stem projection set off from it. This also applies to the circumferential wall 15 of the piston 2, which wall is hollow-cylindrical in the region of the hollow space 9 and likewise extends forwards in one piece from the base section 11 and is connected by friction welding to the end section 12 or a circumferential-wall projection 16 arranged around it. Inwardly from the weld, denoted generally by 17, the central stem 13 is radially supported on the circumferential wall 15 by an annular disc 18, the annular disc 18 bearing against an inner shoulder surface 13a preferably present on the circumferential wall 15.

Extending longitudinally in each case through the piston 2 and the slipper 3 is a channel 19a, 19b, which opens into a shallow recess 22 arranged at the plane bottom surface 21 of the slipper 3. When the hydrostatic machine is in operation, the working pressure in the hydraulic medium can be transmitted through the channels 19a, 19b up to the recess 22, where the hydraulic medium brings about lubrication and the pressure brings about a pressure relief in a manner known per se.

The piston 2 preferably consists of hardenable steel, in particular steel which can be hardened by nitride hardening. To increase the strength and hardness, its lateral surface is preferably nitrided and hardened.

The present ball-and-socket joint 1 is suitable for the pivotable support of a piston 2 for piston machines, in particular axial piston machines, on a supporting surface S, against which the bottom surface 21 of the slipper 3 bears. In an axial piston machine, the supporting surface S may be the oblique surface of a so-called swash plate.

In the text which follows, a description is given of the establishment of a preferred method for producing the piston arrangement comprising the piston 2 and the slipper 3 connected non-detachably thereto. The slipper 3 may be produced as a completely finished component on a large scale and placed in readiness for connection to the piston 2.

The piston 2 is preferably prefabricated likewise on a large scale as a prefabricated piston blank and placed in readiness. In this prefabricated form, the recess edge 7 extends axially with an inside diameter d which can be adapted to the diameter of the joint ball 4 or the joint recess 5 while allowing for freedom of movement, so that the joint ball 4 can be introduced into the joint recess 5. At the same time, the front end part 12 and the remaining part 2b of the piston are produced with a cross-section overmeasure x, which after welding is hardened, optionally after prior nitriding, and is finished by machining, for example by grinding. The method steps before or after welding, namely the formation of the hollow space 9, the joint recess 5 and the channel 19a, may be in any order. What is essential is that the positive connection of the joint ball 4 to the piston 2 is created as the final operation, after the nitriding and/or hardening and finishing of the lateral surface 2c.

For connection, the joint ball 4 and the joint recess 5 are pushed together and the slipper 3 is optionally held in its central position, which may be effected by supporting it. Then, the recess edge 7 is heated by means of a suitable heating device, for example in the form of a heating ring 23 (illustrated schematically) with a width approximately equal to the axial length b, to a temperature at which the hardness of the material is reduced, so that even after the material has cooled the recess edge 7 can be beaded with low deformation forces or can be heated to a temperature at which the strength of the material is reduced and the recess edge can be hot-beaded. In both cases, the recess edge can be beaded plastically into the form illustrated in FIG. 1 with relatively low forces.

The comparatively low deformation forces ensure that the recess edge 7 is deformed without mechanically overloading the slipper 3, which consists, for example, of softer material. The heating may be effected by direct heating, for example by means of a flame, or inductively by an inductive electric heating device. As a result of the local heating of the recess edge 7, the hardened material in this region becomes soft again and can thus be readily deformed without the remaining region of the piston 2 suffering substantially losses in hardness.

An essential advantage of the method according to the invention is that the piston 2 can be completely finished before fitting together with and connection to the slipper 3 without special measures with regard to the beading being required during the above-described heating, such as, for example, covering the recess edge 7 to be deformed, during the nitriding, in particular gas nitriding, turning off regions which have already been nitrided, before the beading, etc. By fine-tuning the heating, beading and cooling operations, the optimum play of the ball-and-socket joint 1 can be set very easily and reliably reproduced even in series production.

Figure 3:
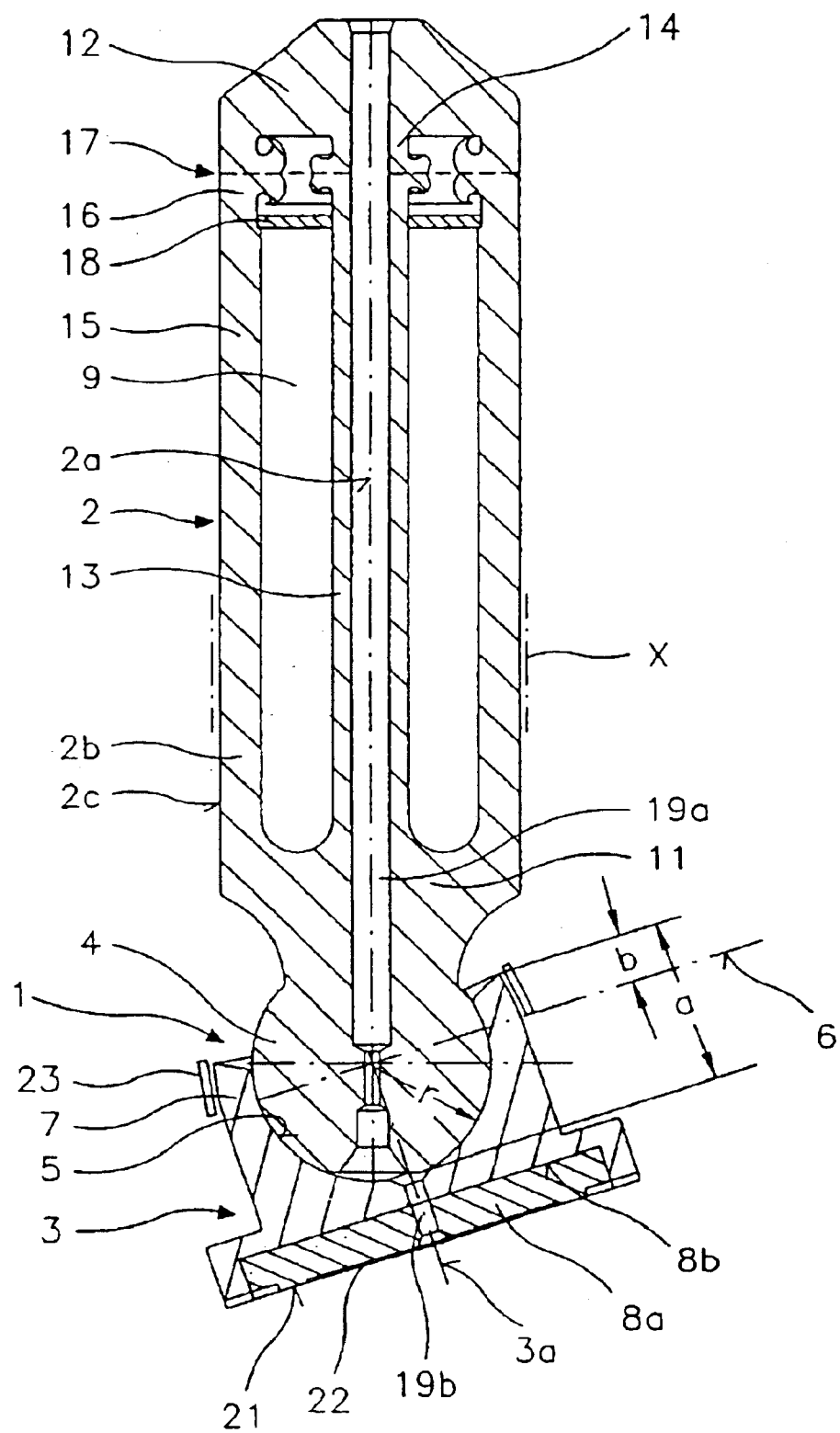
FIG. 3 shows the ball-and-socket joint in a modified configuration.

The exemplary embodiment according to FIG. 3, in which identical or comparable parts are provided with the same reference symbols, differs from the above-described exempla ry embodiment in that the joint ball 4 is formed on the piston 2 preferably in one piece and the slipper 3 has the joint recess 5. In this configuration, the piston 2 is completely fabricated with the joint ball 4, so that it is ready to be brought together with the slipper 3. In this exemplary embodiment, too, the order of the individual method steps during the production of the piston 2 may vary.

The slipper 3 is prefabricated with the joint recess 5 and a recess edge 7, as has already been illustrated and described in FIG. 2, so that repeated description is not necessary. However, in the exemplary embodiment according to FIG. 3, the slipper 3 consists of a hard material such as, for example, steel or preferably nitridable and/or hardenable steel, and to improve the sliding property a sliding part 8a made of a material with a good sliding property, e.g. bronze or brass, which is preferably plate-shaped and forms the base surface 21 of the slipper 3, is provided and is inserted, for example, into a recess 8b and fastened, for example, by soldering or adhesive bonding.

In the final method step for producing the piston arrangement according to FIG. 3, the ball-and-socket joint 1 is created or completed, in accordance with the exemplary embodiment already described, by introducing the joint ball 4 into the joint recess 5 and then heating and hot-beading the recess edge 7.

What is claimed is:

1. In a method of producing a ball-and-socket joint (1) between a slipper (3) and a piston (2) of a piston machine, including the steps of:
   a) configuring the slipper (3) with a joint ball (4) at an end opposite a bottom surface (21) thereof;
   b) configuring the piston (2) at an oversized dimension (x) on a lateral surface (2c) and with a hemispherical joint recess (5) having a free recess edge (7) protruding beyond the maximum diameter (6) of the joint recess (5) at one end of the piston (2);
   c) and finishing the lateral surface (2c) of the piston (2); the improvement comprising:
   d) inserting the joint ball (4) into the joint recess (5) after finishing the lateral surface (2c) of the piston (2) as set forth in step c):
   e) locally heating the free recess edge (7) to a temperature reducing the hardness of the material thereof; and
   f) hot-beading the free recess edge (7) into a circumferentially converging configuration for confining said joint ball (4) within said joint recess (5).

2. In a method producing a ball-and-socket joint (1) between a slipper (3) and a piston (2) of a piston machine, including the steps of:
   a) configuring the piston (2) at an oversized dimension (x) on a lateral surface and with a joint ball (4) at one end thereof;
   b) configuring the slipper (3) with a hemispherical joint recess (5) having a free recess edge (7) protruding beyond the maximum diameter (6) of the joint recess (5);
   c) and finishing the lateral surface (2c) of the piston (2); the improvement comprising:
   d) inserting the joint ball (4) into the joint recess (5) after finishing the lateral surface (2c) of the piston (2) as set forth in step c):
   e) locally heating the free recess edge (7) to a temperature reducing the hardness of the material subsequent to insertion of said joint ball (4) into said recess (5); and
   f) hot-beading the free recess edge (7) into a circumferentially converging form in which said recess edge positively grips the joint ball (4) to inhibit egress of said joint ball from said joint recess.

3. A method according to claim 1 or 2, wherein preceding finishing the lateral surface (2c) of the piston (2), the lateral surface (2c) is selectively nitrided, hardened, or gas-nitrided.

4. A method according to claim 1 or 2, wherein the free recess edge (7) is hot-beaded into a conical form converging towards the free edge thereof.

* * * * *